US006610349B1

(12) United States Patent
Delrue et al.

(10) Patent No.: US 6,610,349 B1
(45) Date of Patent: *Aug. 26, 2003

(54) MILLED CEREAL BY-PRODUCT WHICH IS AN ADDITIVE FOR INCREASING TOTAL DIETARY FIBER

(75) Inventors: Rita M. Delrue, Minnetonka, MN (US); Mark D. Burianek, Greenwood, IN (US); Carol J. Xenides, Indianapolis, IN (US); Steve T. Sheehan, Fishers, IN (US); Sergio Valle, Indianapolis, IN (US)

(73) Assignee: Cargill, Incorporated, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,008

(22) PCT Filed: May 15, 1998

(86) PCT No.: PCT/US98/09913

§ 371 (c)(1),
(2), (4) Date: Jun. 2, 2000

(87) PCT Pub. No.: WO98/51165

PCT Pub. Date: Nov. 19, 1998

(51) Int. Cl.⁷ .............................................. A21D 2/00
(52) U.S. Cl. ..................... 426/622; 426/463; 426/549; 426/618; 426/626
(58) Field of Search ................... 426/463, 331, 426/622, 626, 549, 482, 618

(56) References Cited

U.S. PATENT DOCUMENTS

| | | |
|---|---|---|
| 198,192 A | 12/1877 | d'Heureuse |
| 1,010,202 A | 11/1911 | Thomas |
| 1,574,210 A | 2/1926 | Spaulding |
| 2,704,257 A | 3/1955 | De Sollano et al. ............ 99/93 |
| 3,035,918 A | 5/1962 | Sorgenti et al. ................. 99/1 |
| 3,159,493 A | 12/1964 | Japikse |
| 3,159,494 A | 12/1964 | Lawrence |
| 3,194,664 A | 7/1965 | Eytinge ........................ 99/80 |
| 3,212,904 A | 10/1965 | Gould et al. ................... 99/93 |
| 3,368,902 A | 2/1968 | Berg ............................ 99/83 |
| 3,404,986 A | 10/1968 | Wimmer et al. ............... 99/93 |
| 3,554,772 A | 1/1971 | Hankinson et al. ........... 99/215 |
| 3,653,915 A | 4/1972 | Rubio .......................... 99/80 |
| 3,655,385 A | 4/1972 | Rubio .......................... 99/80 |
| 3,859,452 A | 1/1975 | Mendoza ..................... 426/375 |
| 4,221,340 A | 9/1980 | dos Santos ..................... 241/7 |
| 4,255,459 A | 3/1981 | Glen ........................... 426/521 |
| 4,329,371 A | 5/1982 | Hart ............................ 426/461 |
| RE31,513 E | 1/1984 | Glen ........................... 426/521 |
| 4,543,263 A | 9/1985 | Goldhahn |
| 4,547,383 A | 10/1985 | Goldhahn |
| 4,555,409 A | 11/1985 | Hart ............................ 426/242 |
| 4,594,260 A | 6/1986 | Vaqueiro et al. ............. 426/622 |
| 4,710,386 A | 12/1987 | Fulger et al. |
| 4,735,811 A | 4/1988 | Skarra et al. |
| 4,770,891 A | 9/1988 | Willard ....................... 426/559 |
| 4,844,937 A | 7/1989 | Wilkinson et al. ........... 426/559 |
| 4,882,188 A | 11/1989 | Sawada et al. .............. 426/438 |
| 4,985,269 A | 1/1991 | Irvin et al. .................. 426/560 |
| 4,996,063 A | 2/1991 | Inglett ......................... 426/21 |
| 5,176,931 A | 1/1993 | Herbster ..................... 426/242 |
| 5,225,224 A | 7/1993 | VanNortwick .............. 426/549 |
| 5,296,253 A | 3/1994 | Lusas et al. ................. 426/629 |
| 5,362,511 A | 11/1994 | Vilagran et al. |
| 5,532,013 A | 7/1996 | Martinez-Bustos et al. .. 426/496 |
| 5,558,886 A | 9/1996 | Martinez-Bustos et al. ........... 425/376.1 |
| 5,558,898 A | 9/1996 | Sunderland ................. 426/626 |
| 5,589,214 A | 12/1996 | Palm |
| 5,652,010 A | 7/1997 | Gimmler et al. ............ 426/549 |
| 5,700,505 A | 12/1997 | Hurst |
| 6,056,990 A * | 5/2000 | Delrue et al. ............... 426/622 |

FOREIGN PATENT DOCUMENTS

| | | |
|---|---|---|
| EP | 196464 | 10/1986 |
| EP | 883999 | 12/1998 |
| JP | 59232051 | 12/1984 |
| WO | WO 92/07474 | 5/1992 |
| WO | WO 97/08961 | 3/1997 |
| WO | WO 97/29647 | 8/1997 |

OTHER PUBLICATIONS

Mensah–Agyapong, J. et al., "Nixtamalization of Maize (*zea mays L*) Using a Single Cook–Extrusion Process on Lime–Treated Grits," *J. Sci. Food Agric.*. 60:509–514, 1992.

Martinez et al., "Caracteristicas quimicas y usos de harina instantanea de maiz II.", *Archivos Latinoamericanos de Nutricion*, 1993, 43, 316–320.

O. Parades–Lopez et al., "Maize: A Review of Tortilla Production Technology," *Bakers Digest*, 57:16–25 (1983).

S.A. Watson et al., *Corn: Chemistry and Technology*, pp. 410–429 (American Association of Cereal Chemists, Inc., St. Paul, Minnesota, 1991).

C. Baźua et al., "Extruded Corn Flour as an Alternative to Lime–Heated Corn Flour for Tortilla Preparation," *Institute of Food Technologies*, 1979.

S. Bedolla et al., "Cooking Maize for Masa Production," *Cereal Foods World*, vol. 27, No. 5, pp. 219–221 (1982).

M.N. Kahn et al., "Corn Tortillas: Evaluation of Corn Cooking Procedures," *Cereal Chem.* 59(4), 279–284, 1982.

* cited by examiner

Primary Examiner—Lien Tran
(74) Attorney, Agent, or Firm—Fitch, Even, Tabin, & Flannery

(57) ABSTRACT

The present invention provides a high fiber additive composition which is a by-product of milling processes wherein the high fiber additive enhances the fiber content of a variety of products including flour, yoghurts, beverages, baking items, snack foods such as pretzels, cereal products such as breakfast cereals, and salsa. The additive is provided from a high fiber, low starch source of plant material.

27 Claims, No Drawings

MILLED CEREAL BY-PRODUCT WHICH IS AN ADDITIVE FOR INCREASING TOTAL DIETARY FIBER

The present invention generally relates to an additive composition effective for increasing total dietary fiber in a wide variety of food products.

BACKGROUND OF THE INVENTION

For the preparation of refined foods, cereal grain is usually subjected to a milling process. In these processes, the hulls (bran) and germ, which are the structures rich in minerals and vitamins, are more or less completely removed. Refined mill products, such as masa flour, consist chiefly of the endosperm. Portions of the corn kernel removed from the endosperm, such as the hulls or bran, are considered to be waste by-products which are often put into animal feed.

Components of the Maize (Corn) Kernel

Botanically, a maize kernel is known as a carypoisis, a dry, one-seeded, nutlike berry in which the fruit coat and seed are fused to form a single grain. Mature kernels are composed of four major parts: pericarp (hull or bran), germ (embryo), endosperm and tip cap. The average composition of whole maize, and its fractions, on a moisture-free (dry) basis is as follows:

| Fraction of Whole Maize | Kernel % | Starch % | Protein % | Liquid % | Sugar % | Ash % |
| --- | --- | --- | --- | --- | --- | --- |
| Whole Grain | 100 | 71.5 | 10.3 | 4.8 | 2.0 | 1.4 |
| Endosperm | 82.3 | 86.4 | 9.4 | 0.8 | 0.6 | 0.3 |
| Germ | 11.5 | 8.2 | 18.8 | 34.5 | 10.8 | 10.1 |
| Pericarp | 5.3 | 7.3 | 3.7 | 1.0 | 0.3 | 0.8 |
| Tip cap | 0.8 | 5.3 | 9.1 | 3.8 | 1.6 | 1.6 |

Pericarp: The maize kernel is covered by a water-impermeable cuticle. The pericarp (hull or bran) is the mature ovary wall which is beneath the cuticle, and comprises all the outer cell layers down to the seed coat. It is high in non-starch-polysaccharides, such as cellulose and pentosans. {A pentosan is a complex carbohydrate present in many plant tissues, particularly brans, characterized by hydrolysis to give five-carbon-atom monosaccharides [pentoses]. It is any member of a group of pentose polysaccharides having the formula $(C_5H_8O_4)_n$ found in various foods and plant juices.} Because of its high fiber content, the pericarp is tough.

Germ: The scutulum and the embryonic axis are the two major parts of the germ. The scutulum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutulum contains oil-rich parenchyma cells which have pitted cell walls. Of the sugars present in the germ, about 67% is glucose.

Endosperm: The endosperm contains the starch, and is lower in protein content than the germ and the bran. It is also low in crude fat and ash constituents.

Tip cap: The tip cap, where the kernel is joined to the cob, is a continuation of the pericarp, and is usually present during shelling. It contains a loose and spongy parenchyma.

Corn Milling

In milling corn to obtain flour, the corn is first cleaned, and is then usually passed through a scourer to remove the tip from the germ end of the kernel. The corn is then tempered by the addition of water to a moisture content which is generally from about 21% to about 24%. The corn is frequently then passed through a corn degerminator, which frees the bran and germ, and breaks the endosperm into two or more pieces. The stock from the degerminator is generally dried to about 14% to 16% moisture in revolving dryers equipped with steam coils, and is then cooled in revolving or gravity-type coolers. The stock is next passed through a hominy separator, which first separates the fine particles, and then grades and polishes the larger fragments into four sizes. The various grades of broken corn are passed through centrifugal-type aspirators to remove any loose bran from the endosperm fragments, and produce milled cereal by-products such as aspirated bran. These by-products are waste products which heretofore had little value.

"Aspirated bran" from corn and other cereal grains, is an impure form of whole bran which generally contains some of the floury endosperm, and the starch and protein present therein, and some germ, and the protein present therein, and may contain some grits. Generally, most of the germ and grits will already have been removed from the cereal grain at this point in the milling process. It is possible for the aspirated bran to contain no germ, to contain all of the germ, or to contain any amount of germ in between. Similarly, the aspirated bran fraction may contain no grits from the cereal grain, may contain all of the grits, or may contain any amount of the grits in between.

Masa Flour and Dough

Masa flour (dry corn flour which has usually been nixtamalized) and masa (corn dough which has usually been nixtamalized) are raw materials which may be used for the preparation of tortillas, corn chips, tortilla chips, taco shells, nachos and similar products.

Nixtamalization is the cooking of cereal grain, such as whole corn kernels, in a medium which usually contains an alkaline agent, such as water containing lime (CaO). Thereafter there is steeping (soaking) of the cereal grain for a period of time, for example, for about three to about fourteen hours, subsequent draining of any remaining cooking liquor, washing of the cereal grains, and grinding of the cereal grains to make with drying a cereal grain flour, which may be added with water to make a cereal grain dough from which tortillas and related products may be prepared.

It would also be advantageous to provide an additive which increases the fiber content and nutritional value of products produced from the flour or dough as well as other food products by providing an additive with a higher fiber content, and with additional vitamins and minerals. Further, it would be advantageous to produce such an additive composition without the production of liquid waste with a material which is essentially a waste by-product from the milling of cereal, such as whole corn. It would also be advantageous to provide tortillas and related products prepared with such an additive which would retain the flavors and other positive attributes of tortillas and related products prepared without such additive.

The additive of the present invention imparts the advantageous properties described above to tortillas and other food products, such as juices, other beverages and yogurt. Moreover, food products produced witch the additive composition will be more nutritious and healthful than products which do not contain the additive. Products with the additive of the invention will have a higher fiber content, and also include vitamins and minerals which are present in the by-product from which the additive is made.

SUMMARY OF THE INVENTION

The present invention provides a high, fiber additive composition which is a by-product of milling processes wherein the high fiber additive enhances the fiber content of a variety of products including flour, yogurts, beverages, baking items, snack foods such as pretzels, cereal products such as breakfast cereals, and salsa. The additive is provided from a high fiber, low starch source of plant material. In a very important aspect of the invention, the source of high fiber, low starch is cereal bran or a mixture of bran obtained from the commercial dry milling of corn, wheat, barley, oats, rice, rye, sorghum or any other cereal grain. In an alternative aspect of the invention, the high fiber, low starch source may be soy hulls. The low levels of starch in the additive composition makes it less sticky than additives with higher levels of starch, and hence, the additive composition of the invention can be used in a wide variety of food products.

In an important aspect, the high fiber additive composition comprises aspirated cereal bran having less than about 15 weight percent starch, which starch content is gelatinized, at least about 2 weight percent protein, and at least about 75 weight percent total dietary fiber. In an important aspect, the starch in the cereal bran has been substantially gelatinized. In another important aspect, the starch in the cereal bran is gelatinized by cooking it with at least about 0.05 weight percent, based upon the weight of the bran, calcium oxide or lime or equivalent thereof. This should provide the additive with at least about 0.025 weight percent calcium, based upon the weight of the additive. The additive should also provide a pH of at least about 7 when it is mixed with water and the additive comprises about 10 weight percent of the additive/water mixture. In another important aspect, the high fiber additive composition comprises soy hulls having a very low starch content and at least about 2 weight percent protein, and at least about 75 weight percent total dietary fiber.

In an important aspect, the additive composition comprises soy hulls having little or no starch. The soy hulls also comprise at least about 2 weight percent protein and at least 75 weight percent dietary fiber. In this aspect of the invention which utilizes soy hulls, there is little if any starch to be gelatinized. The soy hulls, however, are heat treated under the same conditions used to gelatinize the starch in cereal bran. This heat treatment opens the structure of non starch polysaccharides such as arakinoxylans, beta glucans and pectic substances.

The invention also includes a process for making the additive composition. The method comprises mixing aspirated cereal bran comprising less than about 15 weight percent starch or soy hulls with water or an alkaline agent and water to provide an aqueous fiber mixture and cooking the aqueous fiber mixture (or alkaline aqueous mixture) to gelatinize the starch in the cereal bran or open the polysaccharide structure in the soy hulls and provide a cooked bran or soy hulls. The cooked product is dried. If an alkaline agent is used during cooking, the cooked product is dried without first removing aqueous alkaline water, such as lime water, to provide a dried alkaline-treated bran. Thereafter, the water treated or alkaline treated bran is milled to a particle size, such that it will pass through a screen mesh with openings of not greater than 0.1 square mm. In an important aspect, the high fiber additive is pulverized such that at least 70 weight percent of the material is smaller than 500 microns. In an important aspect, the bran is corn bran, the starch is corn starch, and the bran additive composition comprises aspirated bran having less than about 15 weight percent starch, of which at least about a substantial amount has been gelatinized. In this aspect, the alkaline agent, such as lime, comprises from about 0.05 to about 5 weight percent based upon the weight of the by-product or bran. The amount of lime, water and cooking are effective for gelatinizing the starch.

DETAILED DESCRIPTION OF THE INVENTION

1. The Additive Composition of the Invention

The present invention provides a high fiber additive composition which is made from a cereal grain by-product or soy hulls. The additive enhances nutritional value by increasing the fiber content of food products that it is added to. The additive composition comprises cereal grain by-product and gelatinized edible starch, at least about 2 weight percent protein, and from about 75 to about 90 weight percent total dietary fiber. (The fiber can be measured as crude fiber, as neutral dietary fiber or as acid dietary fiber by known methods). In an important aspect, the by-product used to make the additive comprises from about 2 to less than about 15 weight percent starch and is preferably from about 5 to about 12 weight percent, with from about 7 to about 10 weight percent being most preferred.

Generally, the starch in the additive which is made from cereal bran is substantially gelatinized to at least about 100% (i.e., with no native starch remaining). Where a lower weight percent of starch is employed to prepare the additive, the greater percent of starch will be gelatinized (probably 100%). At a higher percentage of starch (up to about 15%), slightly less than 100 weight percent of the starch may be gelatinized. The degree to which the starch has been gelatinized may be determined by detecting the loss of birefringence in a manner known by those of skill in the art. For example, it may be determined by microscopic techniques, the absorption, cold paste viscosity, hot paste viscosity and cold water solubles methods described in U.S. Pat. No. 3,404,986.

The cereal by-product used to make the additive composition of the present invention may be an aspirated bran obtained from the commercial dry milling of wheat, barley, oats, rice, rye, sorghum or any other cereal or other grain. In an important aspect, the aspirated bran is from the dry milling of whole corn of any type (dent, flint, sweet, pop, hybrid, yellow, white, blue, black, red, etc.) and, more preferably, is obtained from the dry milling of yellow and white corn. The dry aspirated bran has from about 10 to about 25 weight percent moisture. The bran may also be the white or other fiber produced by commercial wet milling of corn or other cereal grains. Different sizes of whole bran, and/or fragments or pieces of the whole bran, may be employed for the bran.

The cereal bran by-product also contains at least about 2 weight percent protein. This protein may be from the class of albumins, globulins, prolamines or glutelins, for example, zein or glutelin, and adds flavor (good taste) to the products produced with the bran composition additive of the invention.

The additive of the present invention may, optionally, contain one or more additional ingredients, such as vitamins (vitamins A, B, C, D, E, etc.), minerals (calcium, phosphorous, sulphur, magnesium, potassium, iron, zinc, manganese, etc.), germ, other carbohydrates, fats or oils, other proteinaceous materials (such as corn protein or wheat protein), germ other nutrients, flavor ingredients, emulsifiers, preservatives, gums and/or like ingredients which may enhance the quality of products produced from the additive. The quantities of these optional ingredients which may be added to the additive may be easily determined by those of skilled in the art. By way of example, germ or protein may be added such that the additive may comprise from about 0.5 to about 15 weight percent of each of these additional ingredients. In any event, the quantities of these ingredients should be at a weight percent which is high enough to impart some additional beneficial property to products produced with the additive, but which are not so high as to detrimentally affect the increase in flexibility and/or stability imparted to these products by the by-product and gelatinized starch.

2. Method for Preparing the Additive Composition

The high fiber additive composition may be made by heating the cereal bran with water to gelatinize the starch in the bran or by heating the soy hulls in water to alter the non starch polysaccarides as describe above. Alternatively the cereal bran or soy hulls may be the heated with an aqueous alkaline system if the ultimate application for the additive requires a lime constituent such as Mexican food where a lime taste is desirable. When an alkaline agent is used to make the additive a high fiber, low starch containing plant by-product, such as aspirated bran or soy hulls, alkaline agent, such as lime (CaO), and water are mixed and are cooked to provide the additive composition. The water and alkaline agent are in amounts effective to gelatinize the edible starch in the cereal bran or:open the polysaccharide structure of the polysaccharides in the soy hulls at cooking temperatures of from about 70 to about 100° C. In an important aspect, aspirated cereal bran is mixed with water and an alkaline agent, such as lime, to provide an aqueous alkaline bran mixture. The aqueous alkaline bran mixture contains from about 0.05 to about 5 weight percent lime based upon the weight percent of the by-product used to prepare the additive, and preferably about 1.2 weight percent lime. The amount of alkaline agent in the aqueous alkaline bran mixture is effective for providing the mixture with a pH of from about 7 to about 11 and preferably to about 9. The water in the aqueous mixture is an amount effective for providing the cooked, lime-treated bran with a moisture content of from about 20 to about 85 weight percent. The amount of water used to achieve the latter moisture content is minimized so that an alkaline waste water stream is minimized or, eliminated. Moisture may be provided to the cooked product by supplying steam for cooking the product. Steam also minimizes water used in the process and avoids a waste water stream. The moisture content of the cooked mixture will preferably be about 55 weight percent.

In an important aspect, the alkaline agent employed in the process is lime (calcium oxide). Other edible and other non-toxic alkaline materials, such as calcium hydroxide and calcium carbonate may be used. Sufficient amounts of the materials which are alternatives to lime which are equivalent to the use of about 0.05 to about 5 weight percent of lime as aforesaid may be used. The alkaline agent is preferably in a dry form.

The lime can be added in the water employed to cook the cereal bran and starch, can be mixed with the bran and starch prior to water addition, or can be mixed with the bran and starch after water addition. The method for adding the lime to the bran and starch is not critical. However, liquid water is employed to cook the bran and starch.

In a preferred cooking process, about 1.0 weight percent of dry lime is added to the aspirated cereal bran through a dry lime feeder and is mixed with the aspirated bran. Thereafter, water heated to about 200° F. (93° C.) is added into the cooker with mixing in a ratio of about 1 part of water or more to about 1 part of aspirated bran and lime mixture. This should result in a moisture content of the mixture of from about 50 to about 60 weight percent, which is optimal. However, moisture levels within the range of from about 20 to about 80 weight percent will work.

A temperature which is effective to gelatinize the starch to at least about 100%, should be reached. Because corn starch usually gelatinizes at about 160° F. (71° C.), the cooking temperature, or temperature of the heated water, will generally be at least about 135° F. The temperatures employed for cooking and drying the cereal grain bran and starch should not be so high that the composition being cooked or dried becomes burned and, perhaps, loses its functional properties. The preferred cooking temperature, or temperature of the heated water, will generally be from about 167° F. (75° C.) to about 212° F. (100° C.), and is more preferable from about 195° F. (90° C.) to about 210° F. (99° C.), with about 197° F. (92° C.) being most preferred.

The heated water is added through the cooker, and the suspension is stirred to suspend the lime into the aspirated cereal bran and starch. The mixture is mixed at this temperature for from about 20 seconds to about 600 seconds, and preferably from about 60 to about 300 seconds. The temperature of the lime-treated bran and starch upon its discharge from the cooker will generally be from about 190° F. (87° C.) to about 195° F. (90° C.), and is preferably about 197° F. (92° C.). The moisture content of the lime-treated bran fraction and starch upon such discharge will generally be from about 50 to about 60 weight percent.

The cooking of the by-product, water and alkaline agent can be done in a continuous, or in a batch, process. The heating can be achieved in a number of ways, such as by directly injecting live steam or heated water into the mixtures or by adding steam or heated water to maintain the above-described temperature for the mixtures.

The cooked, alkaline-treated high fiber by product optionally may be stored for a period of time prior to drying. However, it must be stored at a temperature which is high enough to prevent microbial spoilage.

After cooking, the cooked alkaline-treated bran may be used wet or may be flash dried (flash dehydrated) without washing to quickly reduce the moisture content thereof to less than about 10 weight percent, and preferably to less than about 3 to about 5 weight percent. In the flash dehydration, high velocity hot air currents having a temperature of from about 350° F. to from about 390° F. are generally employed for rapid dehydration. The total residence time of the composition within the flash dehydrator is generally from about 2 to about 15 seconds. The method of drying to provide the cooked, dehydrated additive is not critical. Other methods of drying the cooked, lime-treated bran, such as with an oven, a steam tube drier, a belt dryer, a spray dryer, or by other methods known by those of skill in the art, may also be used. The inlet temperature of the flash dryer is about 650° F. (343° C.), and the outlet temperature of the flash dryer is about 220° F. (104° C.).

After drying, the cooked dehydrated additive composition is milled in, for example, a stone mill, disc mill, hammer mill, cylinder mill, wet mill or other mill, or otherwise size reduced, such that the average particle diameter of the milled cooked dehydrated additive composition is generally less than about 0.1 square mm. (i.e., the particles will pass through a screen having 0.1 square mm openings) and preferably about 99% of it. However, the average particle size of the milled dehydrated additive composition need only be small enough such that it may be added to flour or dough, and tortillas or related products may be made therefrom. Preferably, a hammermill is employed.

The resulting cooked, dehydrated and milled additive composition then is sifted to remove material coarser than that which will pass through about a U.S. No. 40 mesh sieve. The moisture content of the sifted product will generally be less than about 10 weight percent and will preferably be less than about 8 weight percent. However, the moisture content of the sifted product is not critical. It is possible to add wet additives of the invention to wet masa or other dough to produce the tortillas and related products.

3. Preparation of High Fiber Food Products

The food products to which the high fiber additive may be added may be made by mixing the additive with the flour, dough, beverage or other product such that the resulting product has from about 0.1 to about 10 weight percent additive.

When the food product is a dough or flour, the additives of the present invention may be added in wet or dry form to corn or other cereal grain lime-treated or non-lime treated flour or dough by one of several different methods.

The additive in dry, powdered form may be mixed with dry corn or other cereal grain flour (nixtamalized or not nixtamalized). Thereafter, the dry mixture may be added with water to form a dough from which tortillas or related products may be made.

Alternatively, the additive in dry, powdered form or wet form or the corn or other cereal grain flour may be mixed with water. Then, the resulting water may be mixed with the remaining dry ingredient (corn or other cereal grain flour or bran composition additive in dry, powdered form) to form a dough from which tortillas or related products may be made.

Dry powdered or wet additive may be added with a tortilla dough and thoroughly homogenized therewith. Tortillas or related products may then be made from this dough.

Other methods of adding the additive of the invention to flour or dough may also be employed.

For example, a flour may be produced by mixing 97.5 weight percent of a corn (limed or non-limed) or other cereal grain flour, such as masa, with 2.5 weight percent of the additive of the present invention. This mixture may then be made into a dough by the simple addition of from about 1 to about 1.4 parts by weight of ambient temperature water with about 1 part by weight (dry basis) of the flour mixture together with kneading. Tortillas and related products may then be prepared from this dough in the manner described hereinbelow.

What is claimed is:

1. An additive composition for enhancing the fiber content of food products comprising a cooked fiber by-product selected from the group consisting of cooked cereal bran, soy hulls and mixtures thereof, the additive composition having from about 2 to about 15 weight percent starch, at least about 2 weight percent protein, and at least about 75 weight percent total dietary fiber, the starch in the by-product being gelatinized by an alkaline agent selected from the group consisting of calcium oxide, calcium hydroxide, calcium carbonate and mixtures thereof in an amount of about 100% and the composition being unwashed after gelatinization of the starch therein such that the additive composition has a calcium content of at least about 0.025 when dried to a moisture content of not more than about 10 weight percent, the additive having a moisture content of not more than 80 weight percent.

2. An additive composition as recited in claim 1 wherein the by-product is corn bran.

3. An additive composition as recited in claim 2 wherein the additive composition includes from about 10 to less than about 15 weight percent starch.

4. An additive composition as recited in claim 1 wherein the cereal bran by-product is selected from the group consisting of corn bran, wheat bran, oat bran, barley bran, rice bran, rye bran, sorghum bran and mixtures thereof.

5. An additive composition for enhancing the fiber content of food products, the composition comprising:
   corn bran which includes from about 2.0 to about 15 weight percent starch, at least about 2 weight percent protein, and at least about 75 weight percent total dietary fiber, the starch in the bran being gelatinized by an alkaline agent selected from the group consisting of calcium oxide, calcium hydroxide, calcium carbonate and mixtures thereof in an amount of about 100% and the composition being unwashed after gelatinization of the starch therein such that the additive composition has a calcium content of at least about 0.025 weight percent when dried to a moisture content not more than 10 weight percent, the additive having a moisture content of not more than about 80 weight percent.

6. An additive composition as recited in claim 5 wherein the additive composition has at least about 0.05 weight percent alkaline agent, based upon the weight of the bran.

7. An additive composition for enhancing the fiber content of food product, the composition comprising:
   aspirated corn bran comprising from about 2 to about 15 weight percent starch, at least about 2 weight percent protein, and at least about 75 weight percent total dietary fiber, about 100 weight percent of the starch being gelatinized;
   the starch being gelatinized by mixing the aspirated corn bran with an alkaline agent selected from the group consisting of lime, calcium hydroxide, calcium carbonate and mixtures thereof and water to provide an aqueous alkaline bran mixture and thereafter cooking the aqueous alkaline bran mixture, the alkaline agent comprising from about 0.05 to about 5 weight percent of the aqueous alkaline bran mixture, the amount of water and cooking effective to gelatinize about 100 weight percent of the starch and to provide a cooked alkaline treated bran which is unwashed after gelatinization of the starch therein such that the unwashed bran has a calcium content of at least about 0.025 weight percent when dried to a moisture content of not more than 10 weight percent, the cooked alkaline treated bran having a moisture content of from about 20 to about 80 weight percent.

8. An additive composition as recited in claim 7 wherein the cooked unwashed cooked alkaline treated bran is dried to a moisture content of not more than about 10 weight percent to provide a dried alkaline treated bran and milling the alkaline treated bran to a particle size which will pass through a screen with a mesh of not more than about 0.1 square mm and wherein a mixture of the additive and water comprising 10 weight percent additive, based upon the weight of water and additive, provides a pH of at least about 7.

9. A process for making an additive composition for enhancing the fiber content of food products, the process comprising:
   (a) mixing a cooked high fiber by-product selected from the group consisting of cooked cereal bran, soy hulls and mixtures thereof, with an alkaline agent and water to provide an aqueous alkaline mixture, the alkaline agent selected from the group consisting of lime, calcium hydroxide, calcium carbonate and mixtures thereof, the by-product comprising from about 2 to about 15 weight percent starch, at least about 2 weight percent protein, and at least about 75 weight percent total dietary fiber; and (b) cooking the aqueous mixture to provide a cooked alkaline treated product to gelatinize about 100% of the starch, the cooked alkaline treated product having at least about 0.025 weight percent calcium when dried to a moisture content of not more than about 10 weight percent, the cooked alkaline treated product having a moisture content of from about 20 to about 80 weight percent.

10. A process as recited in claim 9 wherein the cereal bran is selected from the group consisting of corn bran, wheat bran, oat bran, barley bran, rice bran, rye bran, sorghum bran and mixtures thereof.

11. A process as recited in claim 10 wherein the cereal bran is corn bran.

12. A process as recited in claim 9 wherein the high fiber by-product is soy hulls.

13. A process as recited in claims 9 wherein the process further comprises drying the cooked treated product to a moisture content of not more than about 10 weight percent without first removing aqueous lime water from the cooked-treated product to provide a dried alkaline treated product; and milling the dried alkaline treated product to a particle size which will pass through a screen with a mesh of not more than about 0.1 square mm.

14. A process as recited in claim 13 wherein at least about 70 weight percent of the milled dried alkaline treated product is smaller than about 500 microns.

15. A process as recited in claim 9 wherein the food product is a beverage.

16. An additive composition for enhancing the fiber content of food product, the composition comprising:

cereal bran comprising from about 2 to about 15 weight percent starch, at least about 2 weight percent protein, and at least about 75 weight percent total dietary fiber, at least about 100 weight percent of the starch being gelatinized;

the starch being gelatinized by mixing the cereal bran with an alkaline agent selected from the group consisting of lime, calcium hydroxide, calcium carbonate and mixtures thereof and water to provide an aqueous alkaline bran mixture having a pH from about 9 to about 11 and thereafter cooking the aqueous alkaline bran mixture by injecting steam into the aqueous alkaline bran mixture, the amount of water and cooking effective to gelatinize about 100 weight percent of the starch and to provide a cooked alkaline treated bran having a moisture content of not more than about 80 weight percent and which is unwashed after gelatinization of the starch therein such that the unwashed bran has a calcium content of at least about 0.025 weight percent at a moisture content of not more than about 10 weight percent.

17. An additive composition as recited in claim 16 wherein the cooked unwashed alkaline treated bran is dried to a moisture content of not more than about 10 weight percent to provide a dried alkaline treated bran and milling the alkaline treated bran to a particle size which will pass through a screen with a mesh of not more than about 0.1 square mm.

18. An additive composition as recited in claim 16 or 17 wherein the additive composition includes from about 10 to less than about 15 weight percent starch.

19. An additive composition as recited in claim 1 wherein the cereal bran is selected from the group consisting of corn bran, wheat bran, oat bran, barley bran, rice bran, rye bran, sorghum bran and mixtures thereof.

20. An additive composition for enhancing the fiber content of food product, the composition comprising:

cereal bran comprising from about 2 to about 15 weight percent starch, at least about 2 weight percent protein, and at least about 75 weight percent total dietary fiber, at least about 100 weight percent of the starch being gelatinized;

the starch being gelatinized by mixing the cereal bran with an alkaline agent selected from the group consisting of lime, calcium hydroxide, calcium carbonate and mixtures thereof and water to provide an aqueous alkaline bran mixture having a pH from about 9 to about 11 and thereafter cooking the aqueous alkaline bran mixture by heating the aqueous bran mixture to a temperature of at least about 190° F., the amount of water and cooking effective to gelatinize about 100 weight percent of the starch and to provide a cooked alkaline treated bran having a moisture content of not more than about 80 weight percent, the cooked alkaline treated bran being unwashed after gelatinization of the starch therein such that the unwashed bran has a calcium content of at least about 0.025 weight percent at a moisture content of not more than about 10 weight percent.

21. An additive composition as recited in claim 20 wherein the cooked unwashed alkaline treated bran is dried to a moisture content of not more than about 10 weight percent to provide a dried alkaline treated bran and milling the alkaline treated bran to a particle size which will pass through a screen with a mesh of not more than about 0.1 square mm.

22. An additive composition as recited in claim 20 or 21 wherein the additive composition includes from about 10 to less than about 15 weight percent starch.

23. An additive composition as recited in claim 20 wherein the cereal bran is selected from the group consisting of corn bran, wheat bran, oat bran, barley bran, rice bran, rye bran, sorghum bran and mixtures thereof.

24. An additive as recited in claim 7 wherein the cooked alkaline treated bran has a moisture content in the range of from about 50 to about 60 weight percent.

25. An additive as recited in claim 9 wherein the cooked alkaline treated bran has a moisture content in the range of from about 50 to about 60 weight percent.

26. An additive as recited in claim 16 wherein the cooked alkaline treated bran has a moisture content in the range of from about 50 to about 60 weight percent.

27. An additive as recited in claim 20 wherein the cooked alkaline treated bran has a moisture content in the range of from about 50 to about 60 weight percent.

* * * * *